J. H. Shehan,
Pruning Shears.

No. 97,973. Patented Dec. 14, 1869.

Witnesses:
H. M. Hopkins
John A. Straight

Inventor:
J. H. Shehan,
Pr. G. M. Hopkins
Atty.

United States Patent Office.

JOHN H. SHEHAN, OF LIMA, INDIANA, ASSIGNOR TO HIMSELF, GEORGE W. EDGECOMB, AND THOMAS J. BULL.

Letters Patent No. 97,973, dated December 14, 1869.

IMPROVEMENT IN PRUNING-SHEARS.

The Schedule referred to in these Letters Patent and making part of the same.

To all whom it may concern:

Be it known that I, JOHN H. SHEHAN, of Lima, in the county of La Grange, and State of Indiana, have invented a new and useful Improvement in Pruning-Shears; and I do hereby declare that the following is a full, clear, and exact description of the same, reference being had to the accompanying drawing, making a part of this specification, in which—

Figure 1:
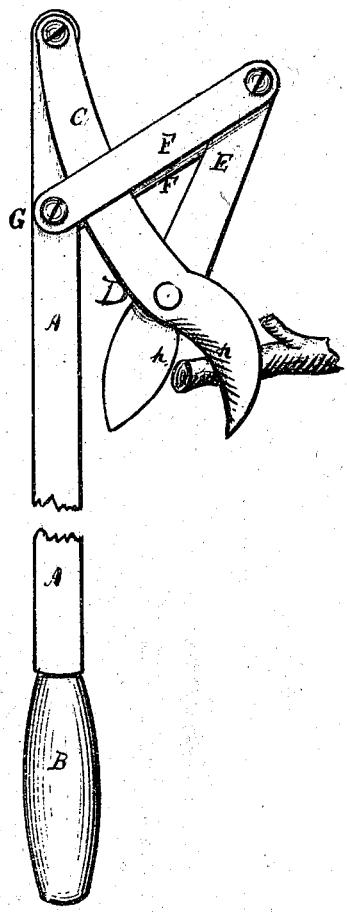
Figure 2:
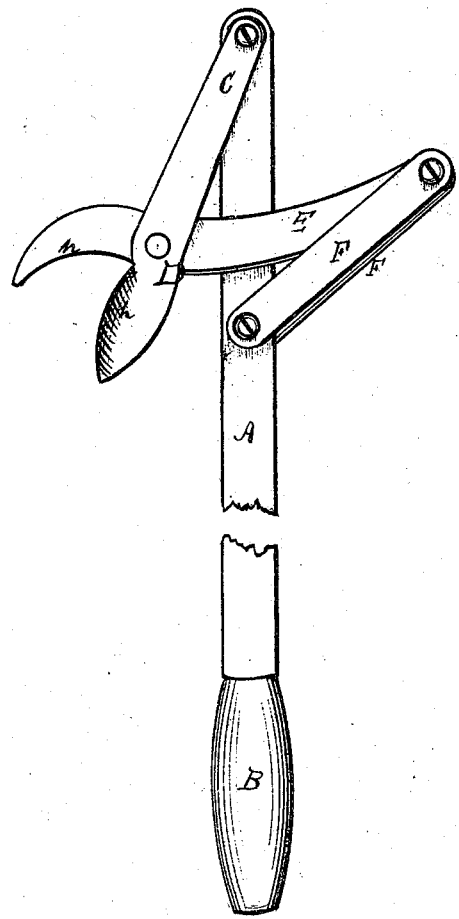

Figures 1 and 2 represent different forms of the implement.

Like letters of reference refer to like parts.

The nature of my invention consists in jointing one lever of a suitably-formed pair of shears to the end of a straight bar or handle of any desired length, and connecting the other lever of the shears to the above-mentioned bar by means of straps, in such a way that when the blades are placed open on a limb, and the straight bar or handle to which the shears are attached is pulled, the shears are made to close.

I will proceed to describe my invention.

In fig. 1, A is a bar, which is provided with a handle, B.

To the upper end of this bar, one lever C of the shears D is jointed. The other lever E is connected, by means of the straps F F, to the bar A at G.

h h are the cutting-blades of the shears, opening downward.

Fig. 2 represents the levers C E, straps F F, and bar A, in different position from fig. 1, but giving the same result.

The operation is as follows:

The blades h h are placed open on a limb; the handle B is pulled. As the levers C and E are brought down by means of the handle B, the shears are closed, severing the limb.

The advantage which I claim for my invention is, that the bar A may be of any length, making it more convenient to prune on long or high limbs; and also, as the implement has but one handle, it requires but one hand to work it.

The arrangement of the bar A, the levers C and E, and straps F F, gives a great lever-power, which makes it much easier to cut off large limbs than with other shears in use.

What I claim as new, and desire to secure by Letters Patent, is—

The arrangement and combination of the shears D, bar A, and straps F F, as shown and described, and for the purpose set forth.

The above specification of my invention signed by me, this 3d day of July, 1869.

JOHN H. SHEHAN.

Witnesses:
GEO. L. NICHOLS,
E. McKINLEY.